(12) United States Patent
Narla (10) Patent No.: US 12,316,125 B2
(45) Date of Patent: May 27, 2025

(54) LOAD CONTROL ARCHITECTURE OF AN ENERGY CONTROL SYSTEM

(71) Applicant: Unirac, Inc., Albuquerque, NM (US)

(72) Inventor: Sandeep Narla, Newark, CA (US)

(73) Assignee: Unirac, Inc., Albuquerque, NM (US)

( * ) Notice: Subject to any disclaimer, the term of this patent is extended or adjusted under 35 U.S.C. 154(b) by 0 days.

(21) Appl. No.: 18/352,596

(22) Filed: Jul. 14, 2023

(65) Prior Publication Data

US 2023/0361574 A1 Nov. 9, 2023

Related U.S. Application Data

(63) Continuation of application No. 17/731,817, filed on Apr. 28, 2022, now Pat. No. 11,705,736.

(60) Provisional application No. 63/181,524, filed on Apr. 29, 2021.

(51) Int. Cl.
*H02J 3/38* (2006.01)
*H02J 3/32* (2006.01)

(52) U.S. Cl.
CPC .............. *H02J 3/381* (2013.01); *H02J 3/32* (2013.01); *H02J 2300/24* (2020.01)

(58) Field of Classification Search
CPC ...... H02J 3/38; H02J 3/381; H02J 3/32; H02J 2300/24
See application file for complete search history.

(56) References Cited

FOREIGN PATENT DOCUMENTS

WO WO-2013158755 A1 * 10/2013 ............... H02J 3/14

* cited by examiner

*Primary Examiner* — Robert L Deberadinis
(74) *Attorney, Agent, or Firm* — Lee & Hayes, P.C.

(57) ABSTRACT

The present disclosure provides an electrical system that includes an energy control system, a photovoltaic (PV) power generation system electrically coupled to the energy control system, an energy storage system electrically coupled to the energy control system, and a smart load panel electrically coupled to the energy control system and to a plurality of backup loads. The energy control system operates in an on-grid mode electrically connecting the PV power generation system to a utility grid and a backup mode electrically disconnecting the PV power generation system from the utility grid. The smart load panel selectively disconnects one or more of the plurality of backup loads from the energy control system when the energy control system is in the on-grid mode and when the energy control system is in the backup mode.

20 Claims, 7 Drawing Sheets

| | Protocol | Subpanel in Hub+/ Far away | Local control customization | Local monitoring |
|---|---|---|---|---|
| Wireless | Autonomous (Freq) | Both | No | No |
| | AC Powerline COMs (PLC) | Both | Yes* | Yes* |
| | Wifi | In Hub + | Yes* | Yes* |
| | Bluetooth | In Hub + | Yes* | Yes* |
| Wired | Uni-logic | Both | No | No |
| | Ethernet | Both | Yes | Yes |
| | CAN | Both | Yes | Yes |

FIG. 9

LOAD CONTROL ARCHITECTURE OF AN ENERGY CONTROL SYSTEM

CROSS-REFERENCE TO RELATED APPLICATIONS AND INCORPORATION BY REFERENCE

This application is a continuation application of U.S. application Ser. No. 17/731,817, filed Apr. 28, 2022, which claims priority to U.S. Provisional Patent Application No. 63/181,524 filed on Apr. 29, 2021, which are all incorporated by reference herein in their entirety for all purposes.

FIELD

The present disclosure relates to systems and methods for integrating a plurality of electrical loads to a backup side of an energy control system.

BACKGROUND

Existing backup power supply systems, such as PV systems, for commercial buildings or residential homes sometimes include storage systems (e.g., a combination of batteries and an inverter) to store power when PV power output exceeds load demand and to provide power when PV power output cannot match load demand during microgrid operation. However, larger loads of local electrical systems, such as air conditioners, electric vehicle chargers, pool pumps, range ovens, etc., are usually not wired to the backup side of the electrical system because large loads tend to drain the storage system rapidly or overload the storage system during microgrid operation. Furthermore, National Electrical Code requires any electrical loads that exceed the capacity of the local energy storage system during microgrid mode to be wired to the non-backup side of the local electrical system. While a majority of residential loads are usually smaller (e.g., less than 40 A) and can be easily configured to receive power supply from the local energy storage system, implementing larger loads (e.g., 40 A or greater) to the backup side of the electrical system is typically tedious and expensive.

Thus, integrating all loads of a local electrical system to a backup side of an energy control system can be challenging.

BRIEF SUMMARY

Accordingly, there is a need for systems and procedures to allow large loads (e.g., 40 A or greater) to be connected to the backup side of an electrical system while providing a user the capability to selectively turn off any load, including the large loads, during backup mode. Disposing all or most electrical loads on the backup side of the electrical system, while still maintaining control of the electrical system, has numerous advantages, such as minimizing grid power usage during on-grid mode and allowing the user to selectively provide backup power to each load of the local electrical system.

In some embodiments, the present disclosure provides an electrical system. In some embodiments, the electrical system includes an energy control system. In some embodiments, the electrical system includes a PV power generation system electrically coupled to the energy control system. In some embodiments, the PV power generation system is configured to generate and supply power. In some embodiments, the electrical system includes an energy storage system electrically coupled to the energy control system. In some embodiments, the energy storage system is configured to store power supplied by the PV power generation system and discharge stored power to the energy control system. In some embodiments, the electrical system includes a smart load panel electrically coupled to the energy control system and to a plurality of backup loads. In some embodiments, the energy control system is configured to operate in an on-grid mode electrically connecting the PV power generation system to a utility grid and a backup mode electrically disconnecting the PV power generation system from the utility grid. In some embodiments, the smart load panel is configured to selectively disconnect one or more of the plurality of backup loads from the energy control system when the energy control system is in the on-grid mode and when the energy control system is in the backup mode. In some embodiments, the smart load panel is configured to selectively disconnect a majority of the plurality of backup loads from the energy control system when the energy control system is in the on-grid mode and when the energy control system is in the backup mode. In some embodiments, the smart load panel is configured to selectively disconnect each of the plurality of backup loads from the energy control system when the energy control system is in the on-grid mode and when the energy control system is in the backup mode.

In some embodiments, the smart load panel includes a load panel controller in communication with a user device. In some embodiments, upon receiving a disconnection command from the user device, the load panel controller is configured to electrically disconnect one or more of the plurality of backup loads from the energy control system when the energy control system is in the on-grid mode and when the energy control system is in the backup mode.

In some embodiments, the smart load panel is configured to maintain electrical connection of the plurality of backup loads to the energy control system when the energy control system is in the on-grid mode and to electrically disconnect one or more of the plurality of backup loads automatically from the energy control system when the energy control system switches from the on-grid mode to the backup mode. In some embodiments, the smart load panel includes a load panel controller configured to detect the frequency or voltage of AC power supplied to the plurality of backup loads. In some embodiments, the load panel controller is configured to determine whether the energy control system has switched from the on-grid mode to the backup mode based on the detected frequency or voltage of AC power supplied to the plurality of backup loads.

In some embodiments, the energy control system includes a system controller and the smart load panel includes a load panel controller in communication with the system controller. In some embodiments, upon receiving a disconnection command from the system controller, the load panel controller is configured to electrically disconnect the one or more backup loads from the energy control system when the energy control system is in the on-grid mode and when the energy control system is in the backup mode. In some embodiments, the load panel controller is in communication with the system controller according to a wireless communication standard. In some embodiments, the wireless communication standard is a Bluetooth standard. In some embodiments, the wireless communication standard is Wi-Fi. In some embodiments, the wireless communication standard is an AC Power Line Communication. In some embodiments, the load panel controller is in communication with the system controller over a wired connection. In some embodiments, the wired connection is based on at least one of direct logic signal(s), RS-485, RS-232, Controller Area Network, and Modbus protocol.

In some embodiments, the electrical system includes a sub-panel electrically coupled to the one or more backup loads and the smart load panel. In some embodiments, the smart load panel is located upstream of the sub-panel and downstream of the energy control system. In some embodiments, the smart load panel is located downstream of the sub-panel and upstream of the one or more backup loads. In some embodiments, the smart load panel comprises at least one of an electromechanical breaker, a relay, and a transistor switch. In some embodiments, the one or more backup loads comprises a rating of 40 amps or greater.

The present disclosure also provides methods for integrating a plurality of electrical loads to a backup side of an energy control system. In some embodiments, the method includes a step of determining a location of one or more of the plurality of electrical loads with respect to the energy control system. In some embodiments, the method includes a step of determining a load control protocol associated with the one or more electrical loads. In some embodiments, the method includes a step of selecting an electrical disconnection component based on the determined load control protocol of the one or more electrical loads. In some embodiments, the method includes a step of connecting the selected electrical disconnection component to the one or more electrical loads and to the backup side of the energy control system. In some embodiments, the method includes a step of selecting a mode of communication between the selected electrical disconnection component and the energy control system based on the determined location of the one or more electrical loads and the determined load control protocol.

In some embodiments, the load control protocol includes allowing a user to selectively connect and disconnect the one or more electrical loads on demand. In some embodiments, the load control protocol includes automatically disconnecting the one or more electrical loads from the energy control system based on a detected frequency or voltage of AC power supply. In some embodiments, the electrical disconnection component includes at least one of an electromechanical breaker, a relay, and a transistor switch. In some embodiments, the selected mode of communication includes at least one of a wireless connection according to a wireless communication standard and a wired connection. In some embodiments, the one or more electrical loads includes a rating of 40 amps or greater.

BRIEF DESCRIPTION OF THE FIGURES

The accompanying drawings, which are incorporated herein and form part of the specification, illustrate embodiments and, together with the description, further serve to explain the principles of the embodiments and to enable a person skilled in the relevant art(s) to make and use the embodiments.

The features and advantages of the embodiments will become more apparent from the detail description set forth below when taken in conjunction with the drawings. A person of ordinary skill in the art will recognize that the drawings may use different reference numbers for identical, functionally similar, and/or structurally similar elements, and that different reference numbers do not necessarily indicate distinct embodiments or elements. Likewise, a person of ordinary skill in the art will recognize that functionalities described with respect to one element are equally applicable to functionally similar, and/or structurally similar elements.

DETAILED DESCRIPTION

Embodiments of the present disclosure are described in detail with reference to embodiments thereof as illustrated in the accompanying drawings. References to "one embodiment," "an embodiment," "some embodiments," "certain embodiments," etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "about" or "substantially" or "approximately" as used herein refer to a considerable degree or extent. When used in conjunction with, for example, an event, circumstance, characteristic, or property, the term "about" or "substantially" or "approximately" can indicate a value of a given quantity that varies within, for example, 1-15% of the value (e.g., ±1%, ±2%, ±5%, ±10%, or ±15% of the value), such as accounting for typical tolerance levels or variability of the embodiments described herein.

The terms "upstream" and "downstream" as used herein refer to the location of a component of the electrical system with respect to the direction of current or power supply. For example, a first component is located "upstream" of a second component when current is being supplied from the first component to the second component, and a first component is located "downstream" of a second component when current is being supplied from the second component to the first component.

The terms "microgrid" and "backup mode" as used herein refer to group of interconnected loads (e.g., plurality of backup loads) and power distribution resources (e.g., backup PV power generation system, energy storage system, and energy control system) that function as a single controllable power network independent to the utility grid.

The following examples are illustrative, but not limiting, of the present embodiments. Other suitable modifications and adaptations of the variety of conditions and parameters normally encountered in the field, and which would be apparent to those skilled in the art, are within the spirit and scope of the disclosure.

Typical single backup power supply systems usually do not meet the load demands of particular loads (e.g., 40 A or greater, such as an air conditioner, an electric vehicle charger, a pool pump, heat pump, well pump, etc.) during backup mode due to the limited storage capacity, current, and power of the energy storage system. Accordingly, these large loads are typically installed on the non-backup side of the electrical system to avoid overload or reduce the load demand of the backup power supply system. Moving large loads to the non-backup side, however, typically requires specific types of breakers or subpanels, rendering the installation process cumbersome and expensive.

Thus, there is a need for new systems and procedures that allow large loads to be electrically coupled to the backup side of an electrical system without overloading or excessively draining backup power supply during the backup mode. Furthermore, there is a need for systems and procedures that allow users to selectively disconnect large loads from backup power supply during backup mode.

According to embodiments described herein, the electrical systems of the present disclosure can overcome one or more of these deficiencies, for example, by providing a smart load panel electrically coupled to an energy control system that is electrically coupled to a backup power source (e.g., PV system and/or energy storage system). The smart load panel is configured to maintain electrical connection of the plurality of backup loads to the energy control system when the energy control system is in the on-grid mode and to electrically disconnect one or more of the plurality of backup loads from the energy control system when the energy control system is in the backup mode. By disconnecting one or more (e.g., large) backup loads when the electrical system switches to the backup mode, the smart load panel can allow larger loads, such as, for example, an air conditioner, an over range, electrical vehicle, etc. to be electrically coupled to the backup side of a microgrid interconnection device without posing a risk of AC overload or fast draining of the energy storage system during the backup mode.

Figure 1:
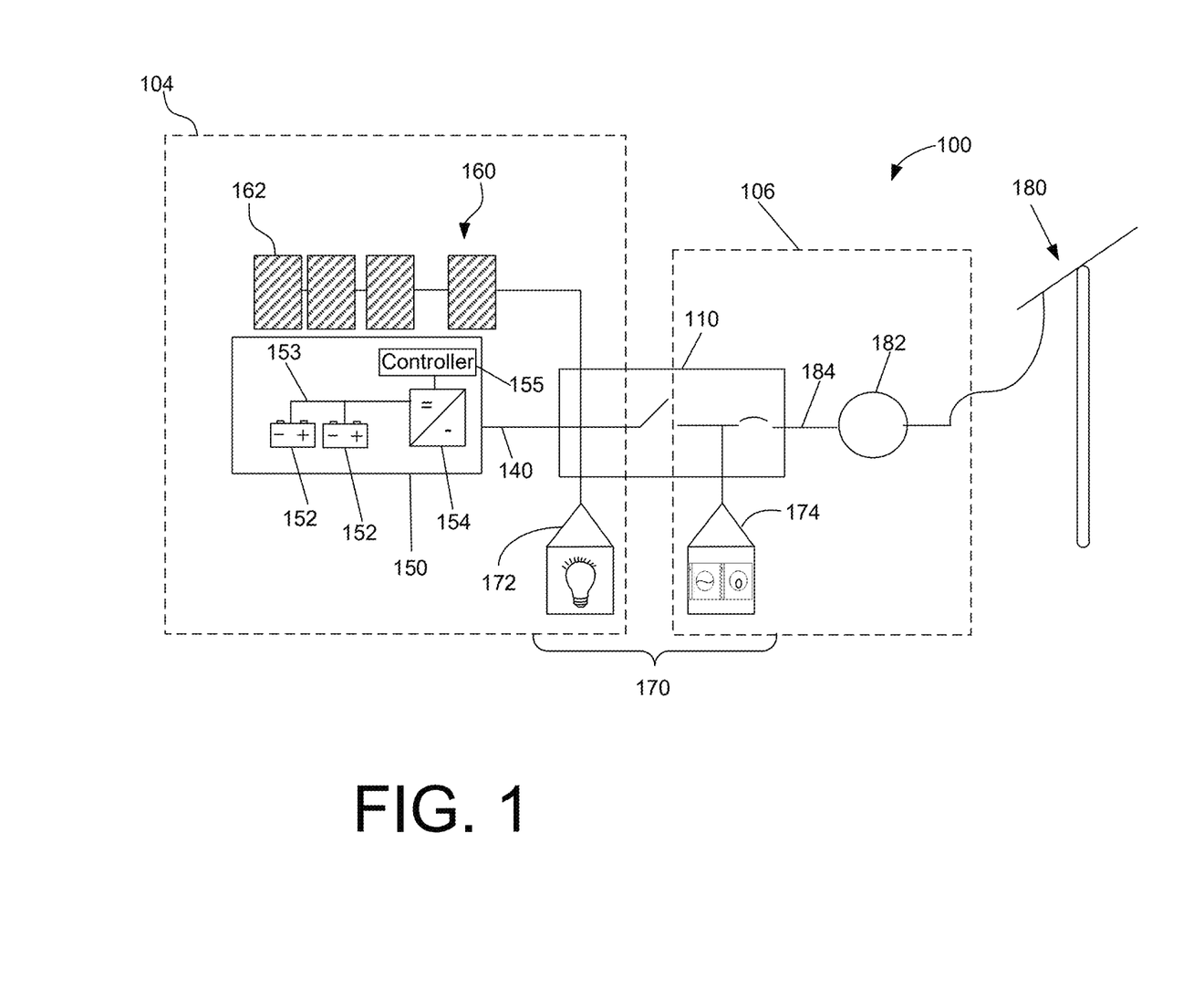
FIG. 1 illustrates an electrical system according to an embodiment.
Figure 2:
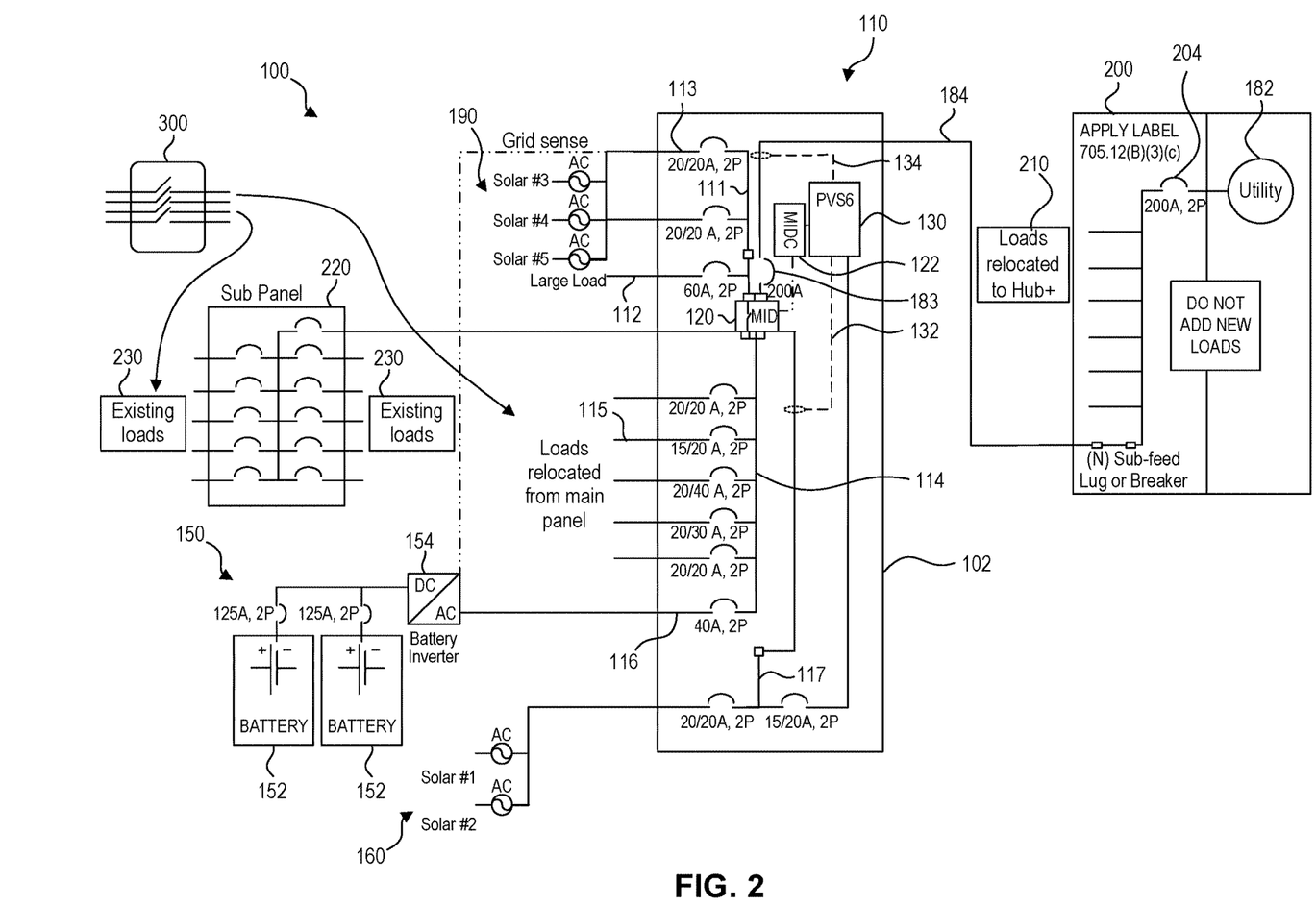
FIG. 2 illustrates an electrical system according to an embodiment.
Figure 3:
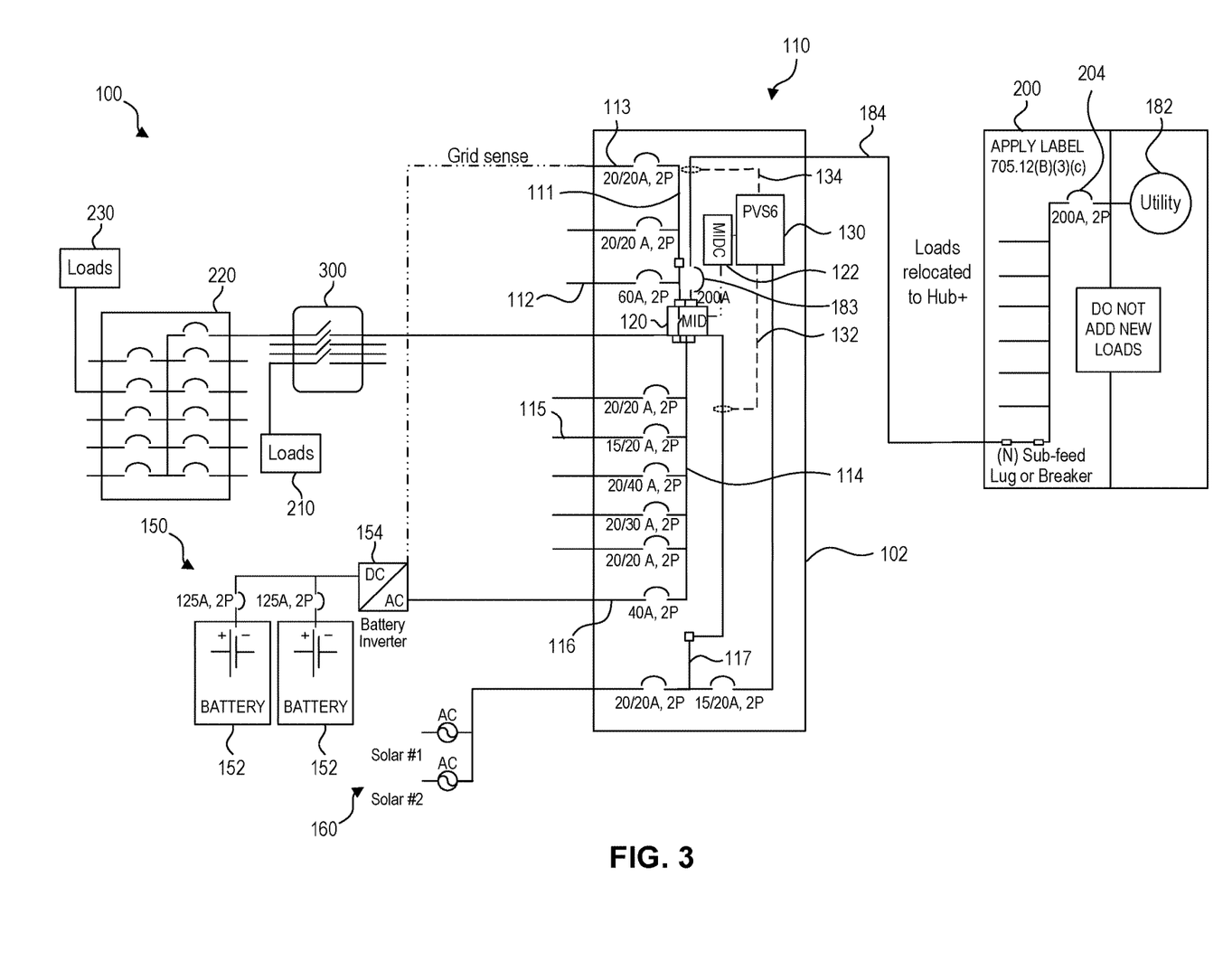
FIG. 3 illustrates an electrical system according to an embodiment.

FIGS. 1-3 show an energy control system 110 for controlling the operation of an electrical system 100 according to some embodiments. Electrical system 100 can include, for example, an energy storage system 150, a backup photovoltaic ("PV") power system 160, a plurality of electrical loads 170, a connection (e.g., a power bus with a subpanel and/or meter 182) to a utility grid 180, and/or a non-backup PV power generation system (e.g., non-backup PV power generation system 190 shown in FIG. 2). In some embodiments, energy control system 110 can control the power distribution between energy storage system 150, backup PV power generation system 160, the plurality of electrical loads 170, the connection to the utility grid 180, and/or non-backup PV power generation system 190. In some embodiments, energy control system 110 and electrical system 100 can include any component or be operated in any way, as disclosed in U.S. application Ser. No. 16/811,832, filed Mar. 6, 2020, titled "ENERGY CONTROL SYSTEM," the entirety of which is incorporated herein by reference. In some embodiments, energy storage system 150, backup PV power generation system 160, and/or at least one of the electrical loads 170 (e.g., plurality of backup loads 172) can be located on a backup side 104 of energy control system 110 such that energy control system 110, energy storage system 150, backup PV power generation system 160, and/or at least one of the electrical loads 170 (e.g., plurality of backup loads 172) can be configured as a single controllable power network independent of utility grid 180. In some embodiments, utility grid 180 and/or non-backup PV power generation system 190 is electrically coupled to a non-backup side 106 of energy control system 110.

In some embodiments, energy storage system 150 can include one or more batteries 152 configured to store electrical energy generated by backup PV power generation system 160. In some embodiments, energy storage system 150 can include a storage converter 154 (e.g., inverter) electrically coupled to the batteries 152 by a direct current (DC) bus 153 and electrically coupled to energy control system 110 by an alternating current (AC) bus 140. In some embodiments, storage converter 154 can be configured to convert the DC current discharged from batteries 152 to an AC current that emulates power characteristics (e.g., voltage magnitude and frequency) of utility grid 180, such as for example, split phase AC at 240V/120V. In some embodiments, storage converter 154 can be configured to covert AC to DC. In some embodiments, storage converter 154 can be configured to adjust a charging rate and/or a discharging rate of the one or more batteries 152. In some embodiments, storage converter 154 can be configured to adjust the frequency of AC power (e.g., AC voltage) supplied to backup side 104 (e.g., the frequency of microgrid) of energy control system 110. In some embodiments, storage converter 154 can be configured to adjust the frequency of AC power supplied from energy storage system 150 to energy control system 110. In some embodiments, storage converter 154 can be configured adjust the frequency of AC power supplied by backup PV power generation system 160.

In some embodiments, storage converter 154 can include a controller 155 having a processor configured to process input signals and send commands via output signals. In some embodiments, controller 155 can include memory for storing, for example, information about energy storage system 150, backup PV power generation system 160, non-backup PV power generation system 190, and/or energy control system 110. In some embodiments, controller 155 can include firmware stored in the memory of controller 155 for controlling operation of storage converter 154 and/or battery 152. In some embodiments, the firmware of controller 155 can include algorithms that enable the controller 155 to process electronic data received from energy control system 110 and/or backup PV power generation system 160. In some embodiments, execution of the stored algorithms can allow controller 155 to detect frequency of AC power supplied by backup PV power generation system 160, charging/discharging rate of batteries 152, and/or state of charge of batteries 152. In some embodiments, execution of the firmware can allow the controller 155 to adjust charging/discharging rate of batteries 152 and/or adjust frequency of AC power supplied to the backup PV power generation system 160 based on the processed electronic data and/or detected measurements.

In some embodiments, backup PV power generation system 160 can include one or more power generation arrays (e.g., a photovoltaic panel array), and each power generation array can include one or more power generation units 162 (e.g., a photovoltaic panel) configured to generate electrical energy. In some embodiments, backup PV power generation system 160 can include one or more PV converters (e.g., a micro-inverter). In some embodiments, the PV converter can include any type of components (e.g., an inverter) such that the PV converter is configured to convert DC to AC or vice versa. In some embodiments, at least one PV converter can synchronize the phase of the power feed to split-phase AC that emulates power characteristics (e.g., voltage magnitude and frequency) of utility grid 180, such as for example, split phase AC at 240V/120V. In some embodiments, the PV converter can be a part of power generation unit 162. In some embodiments, one, two, three, four, or more power generation units can be interconnected to a single PV converter (e.g., a string inverter). In some embodiments, backup PV power generation system 160 can include one or more power optimizers such as, for example, DC power optimizers. In some embodiments, backup PV power generation system 160 can include a feed circuit configured to distribute power to the energy control system 110.

In some embodiments, the plurality of electrical loads 170 can be separated into backup load(s) 172 and non-backup load(s) 174. In some embodiments, a plurality of backup loads 172 include one or more essential loads that continue to receive power from the backup PV power generation system 160 and/or energy storage system 150 during a power grid outage, and a plurality of non-backup loads 174 includes one or more non-essential loads that do not receive power from the backup PV power generation system 160 and/or energy storage system 150 during a utility power outage. In the context of the present disclosure, an electrical load can be, for example, one or more devices or systems that consume electricity. In some embodiments, the plurality of electrical loads 170 can include all or some of the electrical devices associated with a building (e.g., a residential home). In some embodiments, the plurality of electrical loads 170 can include 240-volt loads. In some embodiments, the plurality of electrical loads 170 can include, for example, an electric range/oven, an air conditioner, a heater, a hot water system, a swimming pool pump, and/or a well pump. In some embodiments, the plurality of electrical loads 170 can include 120-volt loads. In some embodiments, the plurality of electrical loads 170 can include, for example, power outlets, lighting, networking and automation systems, a refrigerator, a garbage disposal unit, a dishwasher, a washing machine, other appliances, a septic pump, electric vehicle charger, and/or an irrigation system.

In some embodiments, non-backup PV power generation system 190 can include one or more power generation arrays (e.g., a photovoltaic panel array), and each power generation array can include one or more power generation units (e.g., a photovoltaic panel). In some embodiments, non-backup PV power generation system 190 can include one or more PV converters. In some embodiments, PV converter can include the features of any one of the converters described herein.

In some embodiments, energy control system 110 can include any number of interconnections to control the flow of energy between energy storage system 150, backup PV power generation system 160, the plurality of electrical loads 170, utility grid 180, and/or non-backup PV power generation system 190. For example, in some embodiments, energy control system 110 can include a grid interconnection 184 electrically coupled to a utility grid 180 so that grid power is distributed to energy control system 110. In some embodiments, grid interconnection 184 can include a main overcurrent protection device 183 that is electrically disposed between utility grid 180 and other components of energy control system 110. In some embodiments, energy control system 110 can include a non-backup power bus 111 (e.g., 125 A rating bus) having one or more non-backup load interconnections 112 electrically coupled to the plurality of non-backup loads 174 and a non-backup PV interconnection 113 electrically coupled to non-backup PV power generation system 190. In some embodiments, energy control system 110 can include a backup power bus 114 (e.g., 200 A rating bus) having one or more backup load interconnections 115 electrically coupled to the plurality of backup loads 172 and a storage interconnection 116 electrically coupled to energy storage system 150. In some embodiments, energy control system 110 can include a backup photovoltaic interconnection 117 (e.g., 125 A rating bus) electrically coupled to backup PV power generation system 160. In the context of the present disclosure, an interconnection includes any suitable electrical structure, such as a power bus, wiring, a panel, etc., configured to establish electrical communication between two sets of circuits. Any one of interconnections 112, 113, 115, 116, 117, and 184 can include an AC bus, a panel, a sub-panel, a circuit breaker, any type of conductor, or a combination thereof.

In some embodiments, energy control system 110 can include a microgrid interconnection device 120 (e.g., an automatic transfer or disconnect switch) electrically coupled to non-backup power bus 111 (e.g., located on a load side of microgrid interconnection device 120) and backup power bus 114 (e.g., located on a line side of microgrid interconnection device 120), such that microgrid interconnection device 120 is electrically coupled to non-backup load interconnection 112, non-backup PV interconnection 113, backup load interconnection 115, storage interconnection 116, and/or backup PV interconnection 117. In some embodiments, microgrid interconnection device 120 is electrically coupled (e.g., directly) to grid interconnection 184. In the context of the present disclosure, a microgrid interconnection device can be, for example, any device or system that is configured to automatically connect circuits, disconnect circuits, and/or switch one or more loads between power sources. In some embodiments, microgrid interconnection device 120 can include any combination of switches, relays, and/or circuits to selectively connect and disconnect respective interconnections 113, 115, 116, 117, and 184 electrically coupled to energy control system 110. In some embodiments, such switches can be automatic disconnect switches that are configured to automatically connect circuits and/or disconnect circuits. In some embodiments, such switches can be transfer switches that are configured to automatically switch one or more loads between power sources.

In some embodiments, microgrid interconnection device 120 can be configured to operate in an on-grid mode (e.g., closed), in which microgrid interconnection device 120 electrically connects the backup power bus 114 to both the non-backup power bus 111 and grid interconnection 184. In some embodiments, when operating in the on-grid mode, microgrid interconnection device 120 can be configured to distribute electrical energy received from utility grid 180 and/or non-backup PV power generation system 190 to backup loads 172. In some embodiments, when operating in the on-grid mode, microgrid interconnection device 120 can be configured to distribute electrical energy received from energy storage system 150 and/or backup PV power generation system 160 to non-backup loads 174 and/or utility grid 180.

In some embodiments, microgrid interconnection device 120 can be configured to operate in a backup mode, in which microgrid interconnection device 120 electrically disconnects both non-backup power bus 111 and grid interconnection 184 from backup power bus 114 and backup PV interconnection 117. In some embodiments, when operating in the backup mode, microgrid interconnection device 120 can disrupt electrical connection from non-backup PV power generation system 190 from reaching backup loads 172. In some embodiments, when operating in the backup mode, microgrid interconnection device 120 can disrupt electrical connection between backup loads 172 and utility grid 180. In some embodiments, when operating in the backup mode, microgrid interconnection device 120 can disrupt electrical connection from energy storage system 150 and/or backup PV power generation system 160 to non-backup loads 174 and/or utility grid 180.

In some embodiments, energy control system 110 can include a controller 122 in communication with microgrid interconnection device 120 and configured to control the distribution of electrical energy between energy storage system 150, backup PV power generation system 160, the plurality of electrical loads 170, utility grid 180, and/or non-backup PV power generation system 190. In some embodiments, controller 122 can be configured to detect the status (e.g., power outage or voltage restoration) of grid interconnection 184 and switch microgrid interconnection device 120 between the on-grid mode and the backup mode based on the status of grid interconnection 184. If the status of grid interconnection 184 indicates a power outage, controller 122 can be configured to switch microgrid interconnection device 120 to the backup mode. If the status of grid interconnection 184 indicates a voltage restoration, controller 122 can be configured to switch microgrid interconnection device 120 to the on-grid mode.

In some embodiments, energy control system 110 includes a PV monitoring system 130. In some embodiments, PV monitoring system 130 includes a communication interface (e.g., one or more antennas) for sending and/or receiving data over a wireless network. In some embodiments, energy control system 110 includes one or more load meters that monitor the current or voltage through certain elements of electrical system 100 and transmit data indicating the monitored current or voltage to PV monitoring system 130 and controller 122. For example, a load meter can monitor the flow of power from microgrid interconnection device 120 to backup load interconnection 115. A load meter can monitor the flow of electricity from microgrid interconnection device 120 to backup PV interconnection 117 and non-backup PV interconnection 113. A load meter can monitor the flow of electricity from utility grid 180 to microgrid interconnection device 120.

In some embodiments, PV monitoring system 130 can include a site consumption current transformer 132 (site CT) for monitoring the quantity of energy consumption by the plurality of electrical loads 170. In some embodiments, site CT 132 can be operatively connected to grid interconnection 184. In some embodiments, PV monitoring system 130 can include a PV production CT 134 for monitoring the quantity of PV energy outputted from backup PV power generation system 160. In some embodiments, PV production CT 134 can be operatively linked to backup PV interconnection 117.

In some embodiments, PV monitoring system 130 can read timeseries data and/or disable a reconnection timer of backup PV power generation system 160 and/or non-backup PV power generation system 190. In some embodiments, PV monitoring system 130 can initiate a grid reconnection timer of backup PV power generation system 160. In some embodiments, PV monitoring system 130 can communicate with a battery monitoring system ("BMS") of energy storage system 150. In some embodiments, PV monitoring system 130 can communicate with energy storage system 150 and can, for example, read timeseries data, read power information, write charge/discharge targets, and/or write "heartbeats." In some embodiments, PV monitoring system 130 can receive status and/or power information from microgrid interconnection device 120.

In some embodiments, controller 122 can be linked (e.g., wired or wirelessly) to PV monitoring system 130 such that controller 122 receives electronic data related to backup PV power generation system 160 and/or non-backup PV power generation system 190 from PV monitoring system 130. In some embodiments, controller 122 can transmit commands to PV monitoring system 130 to adjust (e.g., increase or decrease) power output of backup PV power generation system 160 and/or non-backup PV power generation system 190 based on received data. In some embodiments, controller 122 can be configured as a master controller and PV monitoring system 130 can be configured to communicate electronic data (e.g., status of power generation) with controller 122 such that controller 122 controls control energy distribution based on the electronic data transmitted by PV monitoring system 130.

In some embodiments, controller 122 can receive and transmit electronic data (e.g., computer-processable data and/or information represented by an analog or digital signal) over a network, such as, for example, Wireless Local Area Network ("WLAN"), Campus Area Network, Metropolitan Area Network, or Wide Area Network ("WAN"), with components of energy storage system 150, backup PV power generation system 160, non-backup PV power generation system 190, a user's device (e.g., user's smartphone or personal computer), smart device (e.g., load meter) and/or smart appliances (e.g., smart outlets, smart plugs, smart bulbs, smart washers, smart refrigerators). In some embodiments, electronic data can include timeseries data, alerts, metadata, outage reports, power consumption information, backup power output information, service codes, runtime data, etc.

In some embodiments, controller 122 can receive electronic data (e.g., from a load meter) related to load consumption of the plurality of electrical loads 170, including backup loads 172 and/or non-backup loads 174. In some embodiments, electronic data related to the plurality of electrical loads 170 can include information regarding the amount of power consumed by the plurality of electrical loads 170 (including backup loads 172 and/or non-backup loads 174) and the times at which the power was consumed by the plurality of electrical loads 170. In some embodiments, controller 122 can use the collected electronic data to determine a load average per circuit and/or a load average per smart device corresponding to discrete blocks of time throughout the day. For example, time blocks can be broken down into 1-hour blocks, 2-hour blocks, 3-hour blocks, or other time blocks, including, for example, user-designated time blocks (e.g., times when the user may be asleep, at home, or out of the house). In some embodiments, controller 122 can use the collected data to determine an energy demand based on the amount of power consumed by the plurality of electrical loads 170.

In some embodiments, controller 122 can create a time-of-use library (e.g., a database or other structured set of data) that can define a circuit load average for each load and/or a smart device load average for each smart device with respect to the discrete blocks of time throughout the day. In some embodiments, controller 122 can use this information to determine which backup loads 172 receive power as a default during a grid power outage. In some embodiments, controller 122 can use this information to average load consumption by the plurality of backup loads 172 and/or non-backup loads 174 profiled over a day of time.

In some embodiments, the converter of backup PV power generation system 160 can transmit to controller 122 electronic data related to backup PV power generation system 160. In some embodiments, electronic data related to backup PV power generation system 160 can include a current (e.g., an instantaneous) power output of backup PV power generation system 160. In some embodiments, electronic data related to backup PV power generation system 160 can include historical power output measurements of backup PV power generation system 160 recorded over an extended period of time (e.g., days, weeks, months). In some embodiments, electronic data related to backup PV power generation system 160 can include the average power output of the backup PV power generation system 160, for example, profiled over a day. In some embodiments, controller 122 can calculate a predicted power output of backup PV power generation system 160 based on the historical data and other information, such as, for example, weather forecasts and state of the power generation arrays (e.g., power output capacity). In some embodiments, controller 122 uses the average power output of the backup PV power generation system 160 as a predicted power output for controlling operations of electrical system 100.

In some embodiments, storage converter 154 of energy storage system 150 can transmit to controller 122 electronic data related to energy storage system 150. In some embodiments, electronic data related to energy storage system 150 can include information relating to the amount of energy currently stored in energy storage system 150 (e.g., a current state of charge) and/or the amount of energy that energy storage system 150 is capable of absorbing (e.g., via charging). In some embodiments, electronic data related to energy storage system 150 can include the amount of energy being discharged (e.g., current discharging rate and/or the duration of the battery discharging) or predicted to be discharged (e.g., based on a time-of-use library) from energy storage system 150.

In some embodiments, electrical components (e.g., interconnections, switches, relays, AC bus) of energy control system 110 can be integrated into a single housing. For example, as shown in FIG. 2, in some embodiments, energy control system 110 can include a housing 102. In some embodiments, electrical components (e.g., interconnections, switches, relays, AC bus) of energy control system 110 can be disposed in multiple housings, such as for, example, a panel disposed in a home building and a subpanel disposed in a garage or pool house.

As shown in FIG. 2, in some embodiments, electrical system 100 can include a main service panel 200 integrated with utility meter 182. In some embodiments, main service panel 200 can include a main circuit breaker 204. In some embodiments, main service panel 200 can be connected to one or more electrical loads 210. In some embodiments, electrical system 100 can include a subpanel 220 located downstream of main service panel 200 connected to a plurality of electrical loads 230. In some embodiments, the plurality of loads 230 can include small loads having a breaker size of 40 A or less (e.g., lighting, router, television) and large loads having a breaker size greater than 40 A (e.g., air conditioner system, oven).

In some embodiments, as shown in FIGS. 2 and 3, electrical system 100 can include a smart load panel 300 electrically coupled to backup side 104 of energy control system 110. In some embodiments, the plurality of electrical loads 210 can be decoupled from the main circuit breaker 204 and electrically coupled to smart load panel 300. In some embodiments, smart load panel 300 can be electrically coupled to subpanel 220 and/or directly to the plurality of electrical loads 230. In some embodiments, subpanel 220 can be implemented as smart load panel 300 by replacing or supplementing subpanel 220 with circuitry components that allow a controller to selectively disconnect electrical loads 230 from energy control system 110. In some embodiments, smart load panel 300 can be electrically coupled in series between the load appliance wiring of electrical loads 230 and a load breaker of a panel or subpanel. In some embodiments, smart load panel 300 can selectively disconnect each of the plurality of electrical loads 210, subpanel 220, and/or electrical loads 230 from energy control system 110 so that power supplied from PV power generation system 160 and/or energy storage system 150 is not distributed to the selected electrical load. In some embodiments, smart load panel 300 can selectively disconnect one or more of the plurality of electrical loads 210, subpanel 220, and/or electrical loads 230 from energy control system 110 when energy control system 110 is in the on-grid mode and/or when energy control system 110 is in the backup mode. In some embodiments, smart load panel 300 can selectively disconnect a majority of the plurality of electrical loads 210, subpanel 220, and/or electrical loads 230 from energy control system 110 when energy control system 110 is in the on-grid mode and/or when energy control system 110 is in the backup mode. In some embodiments, smart load panel 300 can selectively disconnect each of the plurality of electrical loads 210, subpanel 220, and/or electrical loads 230 from energy control system 110 when energy control system 110 is in the on-grid mode and/or when energy control system 110 is in the backup mode.

In some embodiments, smart load panel 300 can be configured to maintain electrical connection of electrical loads 210, subpanel 220, and/or electrical loads 230 to energy control system 110 when the energy control system 110 is in the on-grid mode. In some embodiments, smart load panel 300 can be configured to electrically disconnect any one of electrical loads 210, subpanel 220, and/or electrical loads 230 from energy control system 110 when the energy control system 110 switches to the backup mode. In some embodiments, the selected load is a large load intended to be disconnected from the energy control system 110 during the backup mode to prevent unwanted power drainage of the energy storage system 150. In the context of present disclosure, a large electrical load as used herein refers to a component configured to receive power from 40 A current source or greater and/or a component configured to consume 2000 or more watts. By selectively disconnecting any one of electrical loads 210, subpanel 220, and/or electrical loads 230 from energy control system 110, smart load panel 300 can allow all the loads of electrical system 100 to be electrically coupled to backup side 104 of energy control system 110, without having any electrical loads coupled to the non-backup side 106 of energy control system 110. Accordingly, smart load panel 300 can save users cost and simplify installation of energy control system 110 by not having to move large loads to the non-backup side 106 of the energy control system 110.

Figure 4:
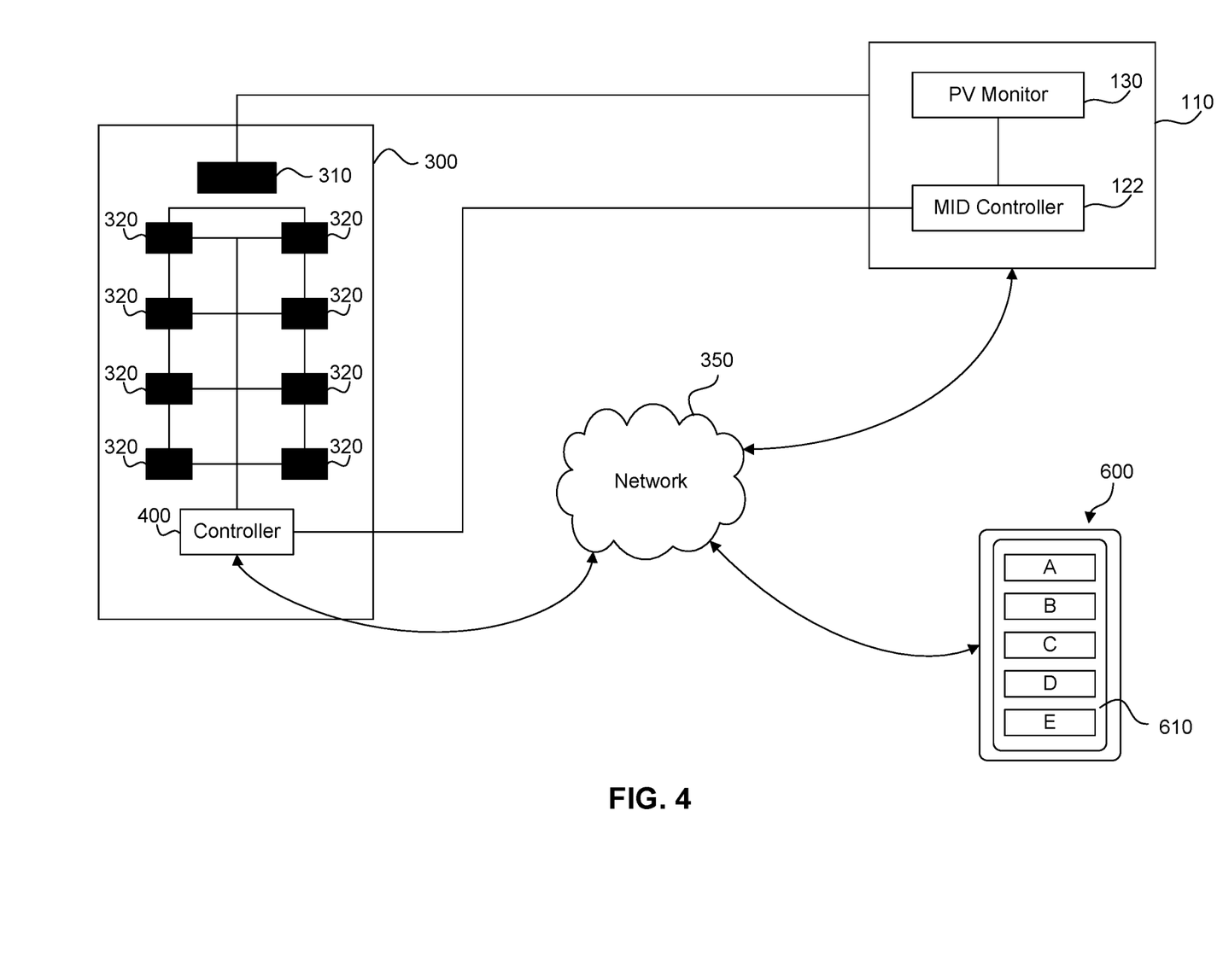
FIG. 4 illustrates a schematic diagram of a smart load panel in communication with a network according to an embodiment.

In some embodiments, smart load panel 300 can be configured as an external service panel integrated with backup side 104 of energy control system 110. With reference to FIG. 4, in some embodiments, smart load panel 300 can include an input port 310 for receiving power (e.g., AC voltage) from energy control system 110. In some embodiments, smart load panel 300 can include one or more load breakers 320 electrically coupled to input port 310 and a respective electrical load (e.g., via a branch power line having a 60 A rating). For example, in some embodiments, smart load panel 300 can include eight load breakers 320 to electrically connect smart load panel 300 to at least eight branch circuits that are electrically coupled to any one of electrical loads 210, subpanel 220, and/or electrical loads 230. In some embodiments, smart load panel 300 can include one or more bus bars 312 (e.g., 300 V rating bus bar) coupled to input port 310, and the one or more load breakers 320 are coupled to a respective bus bar 312. In some embodiments, smart load panel 300 can include any other components (e.g., a printed circuit board) suitable for connecting load breaker 320 to input port 310. Through the one or more load breakers 320, power received at input port 310 can be distributed dynamically to the plurality of electrical loads 210, subpanel 220, and/or electrical loads 230.

In some embodiments, smart load panel 300 can include a load panel controller 400 configured to actuate the one or more load breakers 320 to selectively disconnect any one of electrical loads 210, subpanel 220, and/or electrical loads 230 from energy control system 110. In some embodiments, load panel controller 400 can actuate the one or more load breakers 320 to disrupt the electrical connection to its respective electrical load within a predetermined time period (e.g., a response time in a range between approximately 10 milliseconds and approximately 40 milliseconds) that is compliant with state or national codes and product standards. In some embodiments, load panel controller 400 can be configured to: (1) selectively disconnect large loads (e.g., rated at 40 A or greater) from energy control system 110 when energy control system 110 switches from on-grid mode to backup mode; (2) selectively disconnect predetermined electrical loads from energy control system 110 when energy control system 110 switches from on-grid mode to backup mode; and/or (3) selectively disconnect any one backup loads 172 and electrical loads 210, 230 from energy control system 110 when energy control system 110 switches from on-grid mode to backup mode. In some embodiments, load panel controller 400 can include microprocessor, dedicated or general purpose circuitry (e.g., an application-specific integrated circuit and/or a field-programmable gate array), a suitably programmed computing device, and/or any other suitable circuitry for controlling the operation of the one or more load breakers 320.

In some embodiments, smart load panel 300 can include an enclosure 302 housing input port 310, the one or more load breakers 320, and load panel controller 400. In some embodiments, load panel controller 400 can be disposed its own housing separated from enclosure 302 of smart load panel 300. In some embodiments, enclosure 302 can be configured for indoor (e.g., NEMA-1 rated enclosure) and/or outdoor (e.g., NEMA-3 rated enclosure).

In some embodiments, the one or more load breakers 320 can include any type of circuitry component suitable for disrupting an electrical connection between the respective electrical load (e.g., at least one of electrical loads 210, subpanel 220, and/or electrical loads 230) and energy control system 110.

Figure 5:
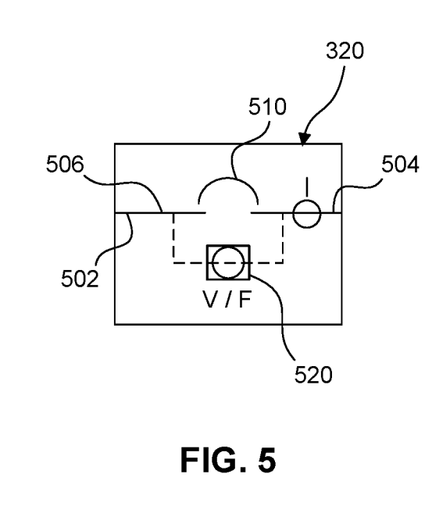
FIG. 5 illustrates a load breaker according to an embodiment.

In some embodiments, as shown in FIG. 5, for example, load breaker 320 can be configured as an electromechanical circuit breaker (e.g., a switch device having a coil, an armature, and contactors). In some embodiments, load breaker 320 can include a line side 502 electrically coupled to energy control system 110 (e.g., via input port 310), and a load side 504 electrically coupled to a respective electrical load (e.g., any one of electrical loads 210 and/or electrical loads 230). In some embodiments, load breaker 320 can include a switch 510 disposed along a line conductor 506 that receives AC voltage and current from line side 502 and distributes voltage and current to load side 504. In some embodiments, switch 510 can be configured to move between a closed position, in which current is allowed to flow from line side 502 to load side 504, and an open position, in which current is disrupted between line side 502 and load side 504.

In some embodiments, load breaker 320 can include sensor circuitry 520 (e.g., a standard resistor chain and signal filter) configured to measure voltage, current, and/or frequency across the line conductor 506. In some embodiments, sensor circuitry 520 can include any type of circuitry component (e.g., a voltmeter, resistor chain, signal filter, a potential transformer, and/or a current transformer), to measure voltage, current, and/or frequency across line conductor 506. In some embodiments, sensor circuitry 520 can be electrically coupled to first phase line, second phase line, neutral line, and/or ground line of the circuit coupled to the respective electrical load (e.g., any one of electrical loads 210 and/or electrical loads 230) to measure voltage between first phase line, second phase line, and/or neutral line.

In some embodiments, load panel controller 400 can be configured to receive measurements (e.g., voltage level, current, and/or frequency) from sensor circuitry 520 of the one or more load breakers 320. In some embodiments, load panel controller 400 can be configured to transmit drive signals directly to switch 510. In some embodiments, load panel controller 400 can be configured to transmit drive signals to an actuator (e.g., solenoid, motor) to move the switch 510 between the open and closed positions. In some embodiments, load panel controller 400 can be configured to transmit a drive signal through a driver to switch 510 and/or actuator of switch 510 to actuate movement between the open and closed positions. In some embodiments, load panel controller 400 can include an analog-to-digital converter to convert analog signals received from sensor circuitry 520 to digital signals. In some embodiments, load panel controller 400 can include a processor for processing input signals and generating the drive signals.

Figure 6:
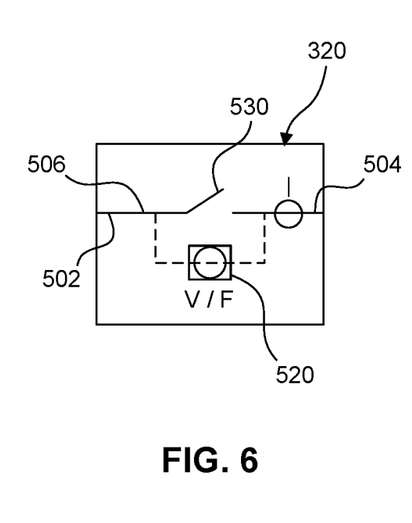
FIG. 6 illustrates a load breaker according to an embodiment.

In some embodiments, as shown in FIG. 6, for example, load breaker 320 can be configured as a smart relay (e.g., a switch device having a coil, an armature, and contactors). Similar to the embodiment shown in FIG. 5, load breaker 320 shown in FIG. 6 can include line side 502, load side 504, line conductor 506, and sensor circuitry 520. In some embodiments, load breaker 320 can include a relay 530, instead of a switch, electrically coupled to line conductor 506. In some embodiments, relay 530 can be configured to switch between a closed position to permit electrical connection between line side 502 and load side 504 and an open position to disrupt electrical connection between line side 502 and load side 504. In some embodiments, load panel controller 400 can be configured to transmit a drive signal to relay 530 to actuate relay 530 to switch between open and/or closed positions.

Figure 7:
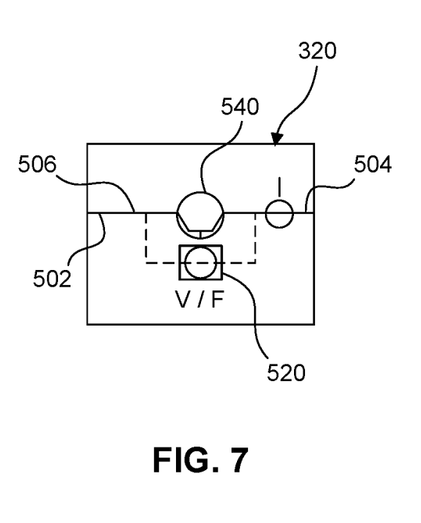
FIG. 7 illustrates a load breaker according to an embodiment.

In some embodiments, as shown in FIG. 7, for example, load breaker 320 can be configured as a solid-state switch (e.g., semiconductor device having a transistor or integrated-circuit). Similar to the embodiment shown in FIG. 5, load breaker 320 shown in FIG. 7 can include line side 502, load side 504, line conductor 506, and sensor circuitry 520. In some embodiments, load breaker 320 can include a transistor 540, instead of a relay, electrically coupled to line conductor 506. In some embodiments, transistor 540 can be configured to switch between a closed setting to permit electrical connection between line side 502 and load side 504 and an open setting to disrupt electrical connection between line side 502 and load side 504. In some embodiments, load panel controller 400 can be configured to transmit a drive signal to a gate of transistor 540 to actuate transistor 540 to switch between open and/or closed settings.

In some embodiments, smart load panel 300 can be configured to detect an electrical characteristic (e.g., voltage, current, and/or frequency) of the power supplied from energy control system 110 to the plurality of electrical loads 210, subpanel 220, and/or electrical loads 230. In some embodiments, smart load panel 300 can use sensor circuitry 520 of load breaker 320 to detect electrical characteristics of the power supply. In some embodiments, smart load panel 300 can include additional sensor circuitry (e.g., a voltmeter, resistor chain, signal filter, a potential transformer, and/or a current transformer) located at input port 310 to measure voltage, current, and/or frequency of power supplied from backup side 104 of energy control system 110.

In some embodiments, load panel controller 400 can receive commands from another controller, such as, for example, controller 122 and/or PV monitoring system 130 of energy control system 110, to control operation of the one or more load breakers 320. For example, load panel controller 400 can communicate with another controller (e.g., controller 122 and/or PV monitoring system 130) over a wired connection and/or wireless connection (e.g., via a Personal Area Network, WLAN, and/or WAN). In some embodiments, the wired connection for load panel controller 400 of smart load panel 300 can be implemented using Uni-logic signal or Multi-logic signal software, an Ethernet line, a Controller Area Network (CAN) bus, RS-232 cable and/or RS-485 cable. In some embodiments, load panel controller 400 can communicate with another controller (e.g., controller 122, PV monitoring system 130, and/or a user device 600) according to a wireless communication protocol, such as wireless fidelity (Wi-Fi under IEEE 802.11), Bluetooth (under IEEE 802.15.1), Zigbee (under IEEE 802.15.4), an AC Power Line Communication (PLC), and/or a broadband cellular network (2G, 3G, 4G, and/or 5G networks).

In some embodiments, controller 122 and/or PV monitoring system 130 of energy control system 110 can monitor electronic data of electrical system 100 and transmit a command to load panel controller 400 of smart load panel 300 to open and/or close the one or more load breakers 320 based on monitored electronic data. In some embodiments, controller 122 or PV monitoring system 130 can process the electronic data within a set time period (e.g., about 5 milliseconds to about 10 milliseconds) and transmit a disconnection command to load panel controller 400 to actuate load breaker 320 within a set response period (e.g., 10 milliseconds to 40 milliseconds). Upon receiving a disconnection command from controller 122 or PV monitoring system 130, load panel controller 400 can electrically disconnect any one of the plurality of electrical loads 210, subpanel 220, and the plurality of electrical loads 230 from energy control system 110.

In some embodiments, as shown in FIG. 4, for example, load panel controller 400 can communicate with a user device 600 over a wireless network 350. User device 600 can be, for example, a cell phone, smartphone, tablet computer, laptop computer, desktop computer, personal computer, wearable computer, smartwatch, or other computing device capable of connecting to a wireless network. In some embodiments, user device 600 can include a user interface 610, such as a touch screen display for receiving user input and displaying information to a user. In some embodiments, user interface 610 can include a combination of touch screens, electromechanical buttons, and/or visual displays.

In some embodiments, user interface 610 of the user device 600 can display information about, for example, the type(s) of loads in electrical system 100, groupings of loads in electrical system 100, present and/or average power consumption of loads (e.g., an energy demand associated with the plurality of loads), the state of load breakers 320, the amount of power available in energy storage system 150, the amount of power produced by power generation system 160, and/or other information relating to electrical system 100. In some embodiments, user interface 610 of the user device 600 can display information about, for example, customizable name of the loads and/or the amount of energy consumed by a circuit over a customizable time period, such as, for example, a time period from approximately one minute to approximately six months (e.g., one day, one week, or one month). In some embodiments, a user can control load breakers 320 remotely via the user device 600. For example, the user device 600 can be configured to transmit a disconnection command over network 350 to load panel controller 400. Upon receiving a disconnection command from user device 600, load panel controller 400 is configured to electrically disconnect any one of the plurality of electrical loads 210, subpanel 220, and/or electrical loads 230 from energy control system 110.

In some embodiments, load panel controller 400 can control operation of the one or more load breakers 320 independently, without communicating with another controller. For example, smart load panel 300 can be configured to automatically disrupt the electrical disconnection between a respective electrical load and energy control system 110 based on processing of a detected electrical characteristic, so that any one of the plurality of electrical loads 210, subpanel 220, and/or electrical loads 230 does not overload or rapidly drain the energy storage system 150. In some embodiments, load panel controller 400 can monitor the frequency of the AC voltage transmitted to a respective load and determine whether energy control system 110 has switched from the on-grid mode to the backup mode based on the detected frequency of power supplied to the respective load. In some embodiments, load panel controller 400 can disconnect any one of the plurality of electrical loads 210, subpanel 220, and/or electrical loads 230 when monitored frequency exceeds a frequency deviation threshold (e.g., in a range from approximately 0.1 Hz to approximately 5 Hz, such as, for example, 0.5 Hz).

Figure 8:
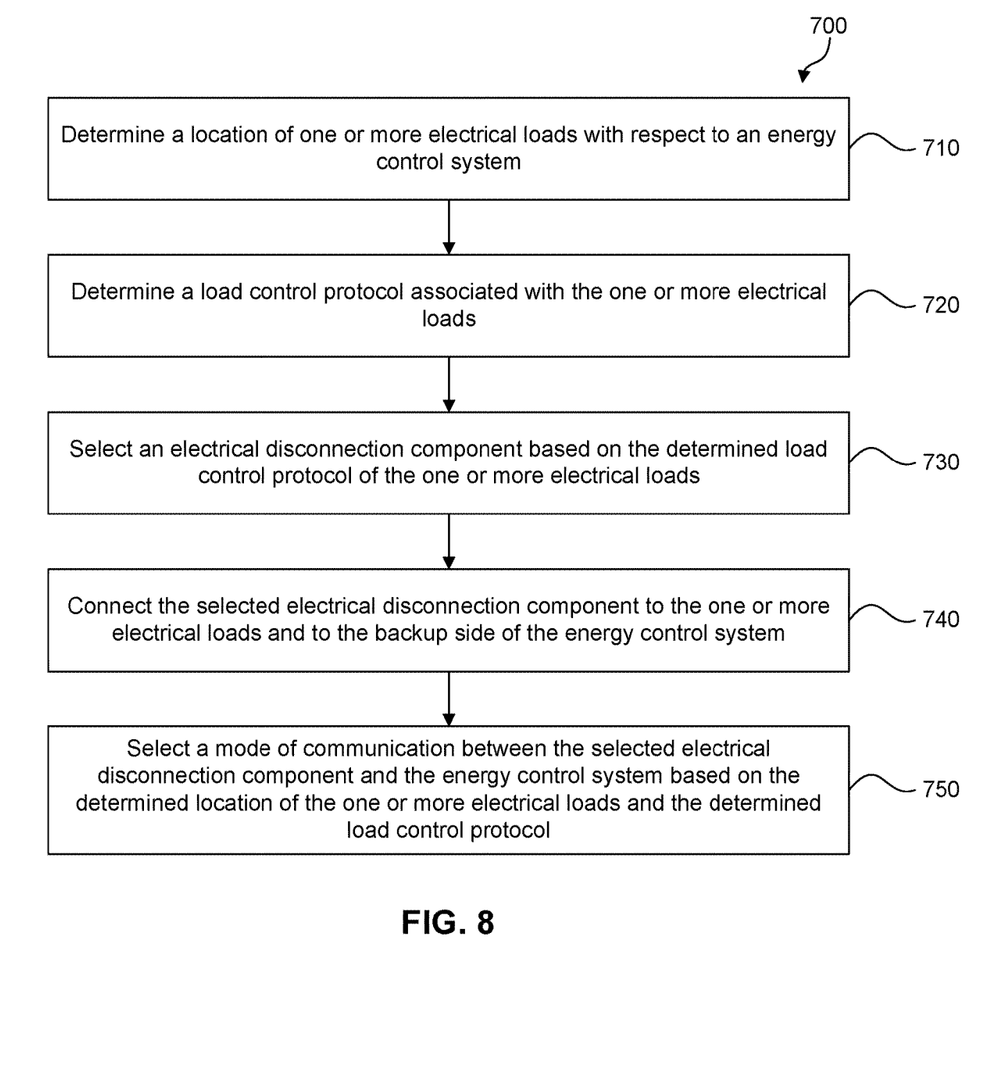
FIG. 8 illustrates a block diagram showing aspects of a method of integrating a plurality of electrical loads to a backup side of an energy control system according to an embodiment.
Figure 9:
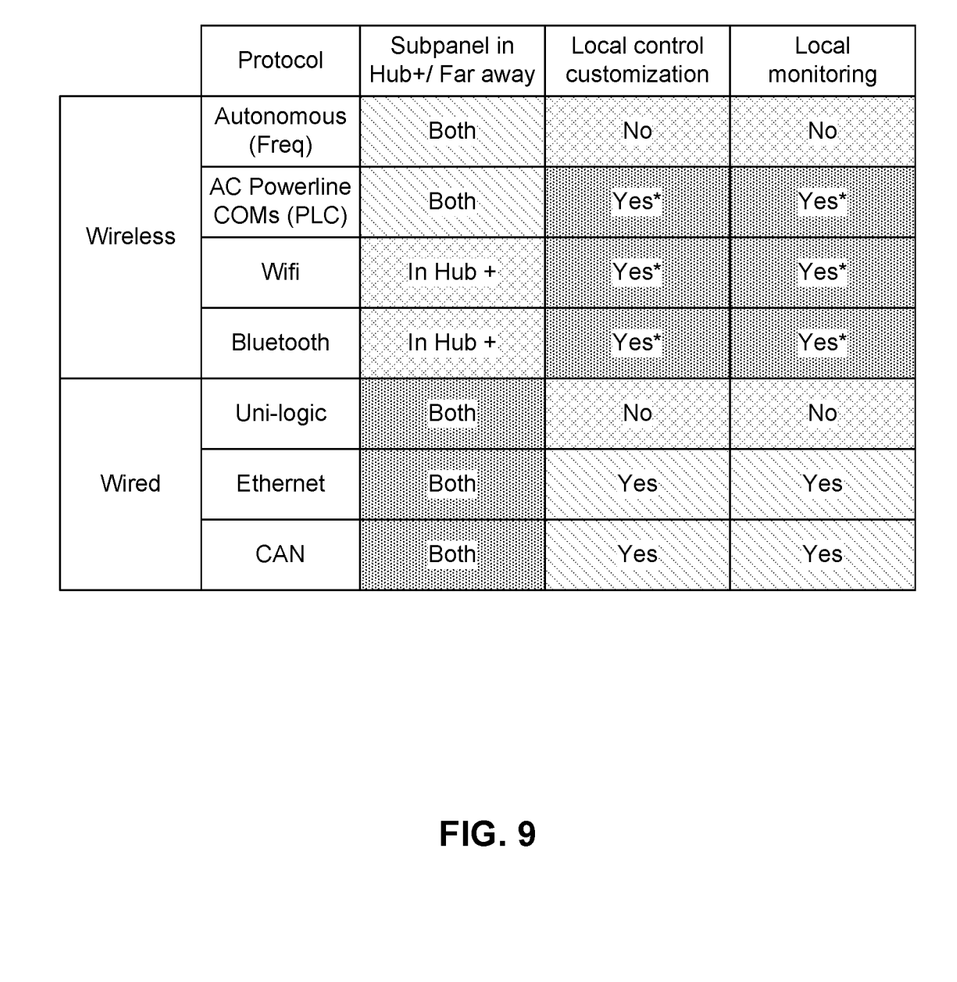
FIG. 9 illustrates a chart showing modes of communication associated with a smart load panel according to an embodiment.

FIG. 8 shows an example block diagram illustrating aspects of a method 700 for integrating a plurality of electrical loads (e.g., the plurality of electrical loads 210, subpanel 220, and/or the plurality off electrical loads 230) into electrical system 100 (e.g., a residential electrical system).

In some embodiments, method 700 can include a step 710 of determining a location of one or more of the plurality of electrical loads (e.g., the plurality of electrical loads 210, subpanel 220, and/or the plurality off electrical loads 230) with respect to energy control system 110. In some embodiments, step 710 can include determining the separation distance between the one or more electrical loads and energy control system 110. In some embodiments, step 710 can include determining whether the electrical load is located on non-backup side 106 or backup side 104 of energy control system 110. For example, the electrical load can be electrically coupled to a main service panel (e.g., service panel 200) that is electrically coupled to non-backup side 106 of energy control system 110. In another example, the electrical load is electrically coupled to a subpanel (e.g., subpanel 220) electrically coupled to backup side 104 of energy control system 110.

In some embodiments, method 700 can include a step 720 of determining a load control protocol associated with the one or more electrical loads (e.g., the plurality of electrical loads 210, subpanel 220, and/or the plurality off electrical loads 230). In some embodiments, the load control protocol includes allowing a user to selectively connect and disconnect the one or more electrical loads on demand (e.g., via user device 600). In some embodiments, the load control protocol includes automatically disconnecting the one or more electrical loads from energy control system 110 based on a detected frequency and/or voltage of AC power supply. In some embodiments, the load control protocol includes receiving commands from controller 122 and/or PV monitoring system 130 of energy control system 110 to selectively connect or disconnect one or more load breakers 320. In some embodiments, the load control protocol includes allowing a controller (e.g., load panel controller 400, controller 122, PV monitoring system 130, and/or user device 600) to monitor the load consumption by the respective electrical load. For example, a controller (e.g., load panel controller 400, controller 122, PV monitoring system 130, and/or user device 600) can actively monitor power usage of the one or more electrical loads, and can turn off certain circuits and/or smart devices if power consumption (e.g., load demand associated with respective electrical loads 210, subpanel 220, and/or the plurality off electrical loads 230)) is too high (e.g., above a predetermined or pre-set threshold). In some embodiments, the load control protocol includes providing load control customization such that a series of defaults, rules, and/or checks are executed to determine which electrical loads are deactivated when energy control system 110 switches from the on-grid mode to the backup mode.

In some embodiments, method 700 can include a step 730 of selecting an electrical disconnection component (e.g., load breaker 320) based on the determined load control protocol of the one or more electrical loads (e.g., the plurality of electrical loads 210, subpanel 220, and/or the plurality off electrical loads 230). In some embodiments, the electrical disconnection component can be smart load panel 300 having the one or more load breakers 320. In some embodiments, load breaker 320 can include an electromechanical breaker, a relay, and/or a transistor switch, as described herein.

In some embodiments, method 700 can include a step 740 of connecting the selected electrical disconnection component (e.g., smart load panel 300 with load breaker 320) to the one or more electrical loads (e.g., the plurality of electrical loads 210, subpanel 220, and/or the plurality off electrical loads 230) and connecting the electrical disconnection component to backup side 104 of the energy control system 110. For example, in some embodiments, step 740 can include electrically decoupling the plurality of electrical loads 210 from main service panel 200 and electrically coupling the plurality of electrical loads 210 to one or more load breakers 320 of smart load panel 300. In some embodiments, step 740 can include electrically coupling subpanel 220 to a respective load breaker 320 of smart load panel 300. In some embodiments, step 740 can include implementing subpanel 220 as a smart load panel by installing remotely-controlled load breakers that are electrically coupled to the plurality of electrical loads 230.

In some embodiments, method 700 can include a step 750 of selecting a mode of communication between the selected electrical disconnection component (e.g., smart load panel 300 with load breaker 320) and energy control system 110 based on the determined location of the one or more electrical loads (e.g., the plurality of electrical loads 210, subpanel 220, and/or the plurality off electrical loads 230) and the determined load control protocol. In some embodiments, the selected mode of communication in step 750 can include a wireless connection according to a wireless communication standard, such as, for example, wireless fidelity (Wi-Fi under IEEE 802.11), Bluetooth (under IEEE 802.15.1), Zigbee (under IEEE 802.15.4), an AC PLC, and/or a broadband cellular network (2G, 3G, 4G, and/or 5G networks). In some embodiments, the selected mode of communication in step 750 can include a wired connection, such as, for example, Uni-logic signal or Multi-logic signal software, an Ethernet line, a CAN bus, RS-232 cable, and/or RS-485 cable.

In some embodiments, the selected mode of communication in step 750 can account for the location of the one or more electrical loads relative to energy control system 110. For example, if the one or more electrical loads are located within a predetermined range of energy control system 110 (e.g., within approximately 30 feet), the selected mode of communication between smart load panel 300 and energy control system 110 can be a wired connection and/or a Bluetooth connection. If the one or more electrical loads are located beyond a predetermined range of energy (e.g., more than approximately 30 feet), the selected mode of communication can be, for example, over a network according to a Wi-Fi protocol.

In some embodiments, the selected mode of communication in step 750 can account for the selected load control protocol. For example, if the selected load control protocol is automatically disconnecting the one or more electrical loads from energy control system 110 based on a detected frequency and/or voltage of AC power supply, the selected mode of communication can be a wired connection implemented by Uni-logic signal or Multi-logic signal software. If the selected load control protocol is allowing a user to selectively connect and disconnect the one or more electrical loads on demand, the selected mode of communication can be a wireless connection, such as Bluetooth, Wi-Fi, and/or cellular or AC PLC. In some embodiments, if the load control protocol is load monitoring and/or receiving commands from energy control system 110, the selected mode of communication can be a wired connection, such as Ethernet line, CAN, and/or RS-458 cable, and/or a wireless connection, such as AC PLC, Bluetooth, and/or Wi-Fi.

In some embodiments, the selected mode of communication in step 750 can account for the feasibility of installing the communication connection with the electrical disconnection component (e.g., smart load panel 300 with one or more load breakers 320). For example, wired connections, such as Ethernet line and CAN, can be more difficult to install, compared to implementing wireless connections, such as Wi-Fi and Bluetooth.

It is to be appreciated that the Detailed Description section, and not the Summary and Abstract sections, is intended to be used to interpret the claims. The Summary and Abstract sections can set forth one or more but not all exemplary embodiments of the present embodiments as contemplated by the inventor(s), and thus, are not intended to limit the present embodiments and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. An electrical system comprising:
   an energy control system;
   a photovoltaic (PV) power generation system electrically coupled to the energy control system;
   an energy storage system electrically coupled to the energy control system and to the PV power generation system; and
   a smart load panel electrically coupled to the energy control system and to a plurality of backup loads,
   wherein the energy control system is configured to operate in an on-grid mode electrically connecting the PV power generation system to a utility grid and in a backup mode electrically disconnecting the PV power generation system from the utility grid,
   wherein the smart load panel is configured to selectively disconnect a backup load of the plurality of backup loads from the energy control system when the energy control system is in the on-grid mode.

2. The electrical system of claim 1, wherein the smart load panel comprises a load panel controller in communication with a user device for controlling a disconnection command.

3. The electrical system of claim 1, wherein the smart load panel is configured to maintain electrical connection of the plurality of backup loads to the energy control system when the energy control system is in the on-grid mode.

4. The electrical system of claim 3, wherein the smart load panel comprises a load panel controller configured to detect the frequency or voltage of AC power supplied to the plurality of backup loads.

5. The electrical system of claim 1, wherein the energy control system comprises a system controller and the smart load panel comprises a load panel controller in communication with the system controller.

6. The electrical system of claim 5, wherein the load panel controller is in communication with the system controller according to a wireless communication standard.

7. The electrical system of claim 6, wherein the wireless communication standard is one of a Wi-Fi standard, AC Power Line Communication, or a Bluetooth standard.

8. An electrical system comprising:
   an energy control system including a system controller;
   a photovoltaic (PV) power generation system electrically coupled to the energy control system;
   an energy storage system electrically coupled to the energy control system and to the PV power generation system; and
   a smart load panel including a load panel controller in communication with the system controller, the smart load panel being electrically coupled to the energy control system and to a plurality of backup loads,
   wherein the energy control system is configured to operate in an on-grid mode electrically connecting the PV power generation system to a utility grid and in a backup mode electrically disconnecting the PV power generation system from the utility grid,
   wherein the smart load panel is configured to selectively disconnect a backup load of the plurality of backup loads from the energy control system when the energy control system is in the backup mode, and
   wherein the load panel controller is in communication with the system controller over a wired connection.

9. The electrical system according to claim 8, further comprising a sub-panel electrically coupled to the the backup load and the smart load panel.

10. The electrical system of claim 9, wherein the smart load panel is located upstream of the sub-panel and downstream of the energy control system.

11. The electrical system of claim 9, wherein the smart load panel is located downstream of the sub-panel and upstream of the one or more backup loads.

12. The electrical system of claim 8, wherein the smart load panel comprises at least one of an electromechanical breaker, a relay, or a transistor switch.

13. The electrical system of claim 8, wherein the backup load of the plurality of backup loads comprises a rating of 40 amps or greater.

14. A method for integrating a plurality of electrical loads to a backup side of an energy control system, the method comprising:
   determining a location of an electrical load of the plurality of electrical loads with respect to the energy control system;
   determining a load control protocol associated with the electrical load;
   selecting an electrical disconnection component based on the determined load control protocol of the electrical load;
   connecting the selected electrical disconnection component to the electrical load and to the backup side of the energy control system, and
   selecting a mode of communication between the selected electrical disconnection component and the energy control system.

15. The method of claim 14, wherein the load control protocol includes allowing a user to selectively connect and disconnect the one or more electrical loads on demand.

16. The method of claim 14, wherein the load control protocol includes automatically disconnecting the one or more electrical loads from the energy control system based on a detected frequency or voltage of AC power supply.

17. The method of claim 14, wherein the electrical disconnection component includes one of an electromechanical breaker, a relay, or a transistor switch.

18. The method of claim 14, wherein the selected mode of communication includes one of a wireless connection according to a wireless communication standard and a wired connection.

19. The method of claim 14, wherein the one or more electrical loads comprises a rating of 40 amps or greater.

20. The method of claim 14, wherein the selecting the mode of communication is performed based on the determined location of the one or more electrical loads and the determined load control protocol.

\* \* \* \* \*